US009779431B1

(12) United States Patent
Sahay

(10) Patent No.: US 9,779,431 B1
(45) Date of Patent: Oct. 3, 2017

(54) DETERMINING COST VARIATIONS IN A RESOURCE PROVIDER ENVIRONMENT

(71) Applicant: Amazon Technologies, Inc., Reno, NV (US)

(72) Inventor: Manjul Sahay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/226,210

(22) Filed: Mar. 26, 2014

(51) Int. Cl.

| | |
|---|---|
| ***G07F 19/00*** | (2006.01) |
| ***H04M 15/00*** | (2006.01) |
| ***G06Q 30/04*** | (2012.01) |

(52) U.S. Cl.
CPC .................................... *G06Q 30/04* (2013.01)

(58) Field of Classification Search
None
See application file for complete search history.

(56) References Cited

U.S. PATENT DOCUMENTS

| | | | | |
|---|---|---|---|---|
| 8,694,176 | B2 * | 4/2014 | Yamamoto et al. | 700/297 |
| 2005/0065863 | A1 * | 3/2005 | Plumer et al. | 705/30 |
| 2006/0161450 | A1 * | 7/2006 | Carey et al. | 705/1 |
| 2006/0167591 | A1 * | 7/2006 | McNally | 700/291 |
| 2010/0138274 | A1 * | 6/2010 | Bateni et al. | 705/10 |
| 2013/0096983 | A1 * | 4/2013 | Forbes et al. | 705/7.31 |

* cited by examiner

*Primary Examiner* — Fateh M Obaid
(74) *Attorney, Agent, or Firm* — Hogan Lovells US LLP

(57) ABSTRACT

Customers of shared resources or services can be informed of unusual variations in cost patterns over at least one determined period, in order to prevent those customers from being surprised upon receiving a significantly larger (or smaller) bill than expected. The daily cost (or portions of the daily cost) for a customer can be compared against the previous day's cost to determine a percentage cost variation. This cost variation can be compared against the mean of the percentage daily cost variations over a previous period, such as the last thirty days, to determine whether the variation falls outside a standard deviation (or other such threshold) from the mean. If so, the cost variation can be determined to be unusual, and the customer notified. The variation can be analyzed using daily, weekly, and monthly periods in order to identify unusual accumulations of small variations as well.

20 Claims, 6 Drawing Sheets

DETERMINING COST VARIATIONS IN A RESOURCE PROVIDER ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, and thus does not have to purchase and maintain the hardware and/or software to provide access to these resources.

In many cases, a customer will receive a bill at the end of a billing cycle indicating the fees due for the amount of resource usage. Unfortunately, the amount of usage can vary significantly, which can result in unexpected fees incurred during the billing cycle. Many customers budget a certain amount of money per cycle for their resource usage. Customers would like to be aware of variations in usage as soon as possible in order to be able to address these variations before significant additional costs are incurred, but conventional monitoring and billing approaches do not provide such visibility.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing customers with information about resource usage, or costs incurred for such usage, in an electronic environment. In particular, various embodiments compare the daily variations in usage and/or cost, for a particular customer, against past variations over at least one determined period. Any variations that fall outside a particular amount of variation, such as more than a standard deviation from a mean of a variation histogram, can cause a notification to be provided to the customer indicating that an unusual usage and/or cost variation was detected which the customer might want to investigate. As an example, a customer can be notified within twenty-four hours or less when a user launches very expensive resources which have dramatically increased costs. By notifying the customer, the customer can analyze the usage of resources and take an appropriate action to prevent further cost overruns. Approaches discussed herein are robust to various changes, such as continually growing and/or seasonal changes, as well.

Various other applications, processes and uses are presented below with respect to the various embodiments.

Figure 1:
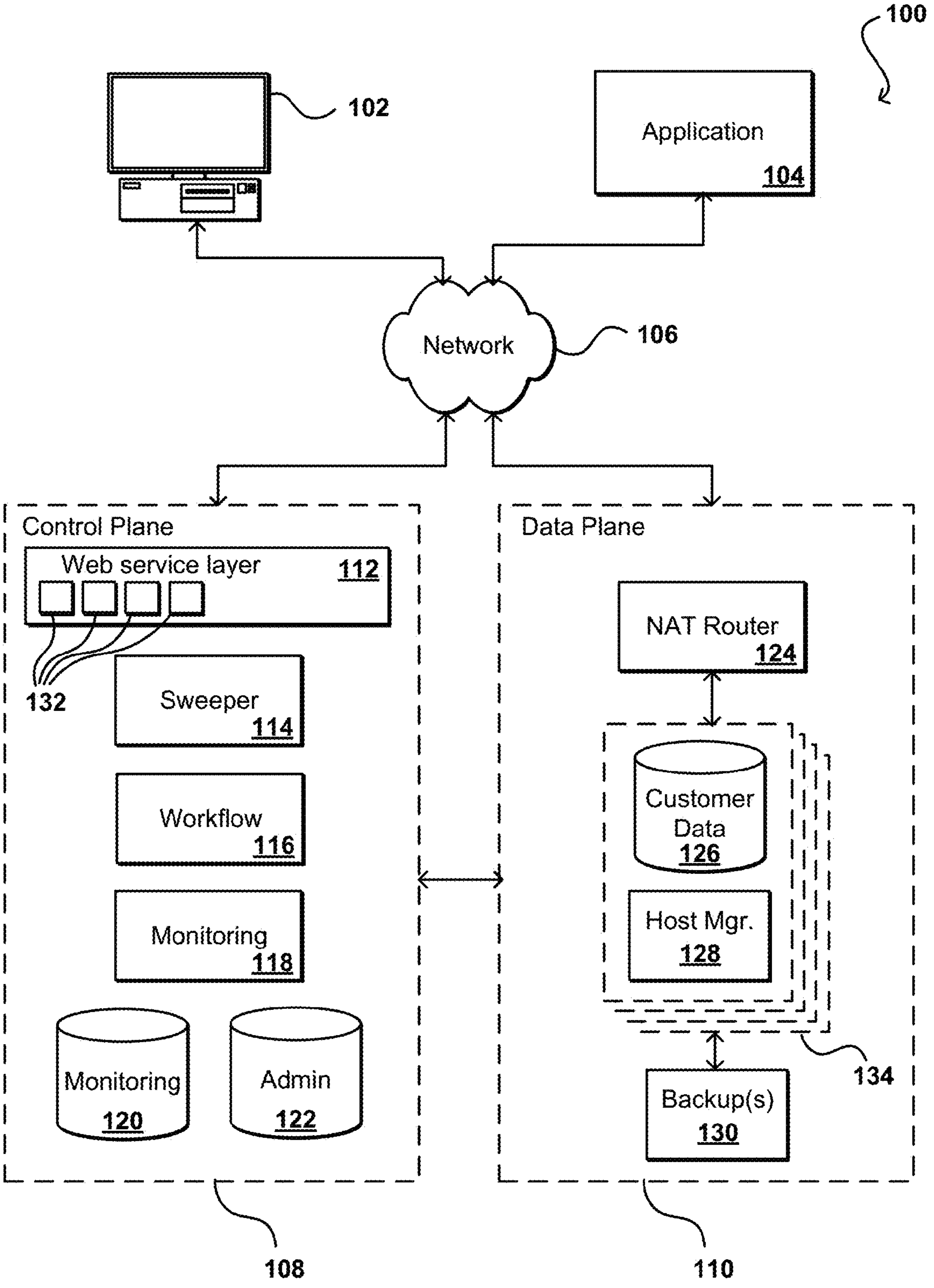
FIG. 1 illustrates an environment in which various embodiments can be implemented.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, relational databases, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task such as to update software on a server of the data plane 210. The user or an application 104 in many instances can access the resource for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 108 in this example is essentially a virtual layer of hardware and software components that handles control and management actions, such as provisioning, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web service calls or requests from across the network 106. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 114. A sweeper component can be any appropriate component operable to poll various components of the control plane or otherwise determine any tasks to be executed in response to an outstanding request. In this example, the Web services layer might place instructions or information for a request in a job queue, and the sweeper component can check back periodically to identify the outstanding request and determine any tasks corresponding to the request. Various other approaches can be used as would be apparent to one of ordinary skill in the art, such as the Web services layer sending a notification to a sweeper component that a job exists. The sweeper component can identify the request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein.

An example workflow for a customer might include tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service. The reply can provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When a data instance is created in the data plane, information for the instance can be written to a data store in the control plane, such as a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 134 in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades for the data store and/or operating system. A host manger also can collect relevant metrics, such as may relate to CPU, memory, and I/O usage.

The monitoring component can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 122 or another such job queue to perform an action for the instance, such as to verify the problem and re-provision the instance if necessary. The sweeper can access this information and kick off a recovery workflow for the instance to attempt to automatically recover from the failure. The host manager 128 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 110 to directly interact with that instance 134. In one embodiment the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, and can have at least one backup instance or copy in persistent storage 130. Using such an approach, once the instance has been configured through the control plane, a user, application, service, or component can interact with the instance directly through requests to the data plane, without having to access the control plane 132. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

As mentioned, customers utilizing resources in such an environment often are charged according to a "pay-as-you-go" model. This approach offers flexibility, as customers can obtain the amount of resource capacity needed at any given time without having to commit to more capacity than is needed, on average, or having to be constrained with less capacity than is needed for certain tasks. A potential downside, however, is that costs can vary as well, which in many cases can result in customers receiving bills that are significantly higher than expected. Unexpected charges lead to customer unhappiness and dissatisfaction, even though the customer was responsible (directly or indirectly) for the charges.

Approaches in accordance with various embodiments can attempt to detect "unusual" variations in usage for a customer in order to notify the customer well in advance of the time of billing, in order to enable the customer to make any desired modifications to the usage in order to minimize or otherwise have some control over the amount of usage. As discussed, an "unusual" variation might be defined as any variation that exceeds an allowable, acceptable, expected, or demonstrated amount of variation, among other such options. In at least some embodiments, daily variations in usage can be compared against historical usage data, and any variations that fall outside a determined range, such as a standard deviation of the mean of a variation histogram, can be determined to be unusual. Unusual variations can be determined in other ways as well, as discussed and suggested elsewhere herein. Any unusual usage amount that is detected can cause the associated customer to be notified, or another appropriate action taken, where the action taken in some embodiments can be predetermined or otherwise specified by the customer. Approaches discussed herein work with various types of usage as well, such as customers with constant usage, continually increasing usage, seasonal variations, and the like.

In some embodiments, usage can be monitored by cost incurred per day. For an example service or resource provider environment, the cost incurred can be based upon a per-unit cost multiplied by the amount of units consumed, where a unit can be an amount of storage capacity allocated, an amount of bandwidth utilized, an amount of processing time utilized, etc. The time unit measured can have various levels of granularity in different embodiments. For example, the time unit might be measured in dollars per hour of processor capacity used, as opposed to units on the order of months or years with conventional approaches. The costs for each of these may be different, as may be agreed upon in advance or set by the provider of the resources, among other such options. The cost per day for a customer then can be the sum of these costs, although other sub-costs or cost breakdowns can be used as well in other embodiments.

Figure 2:
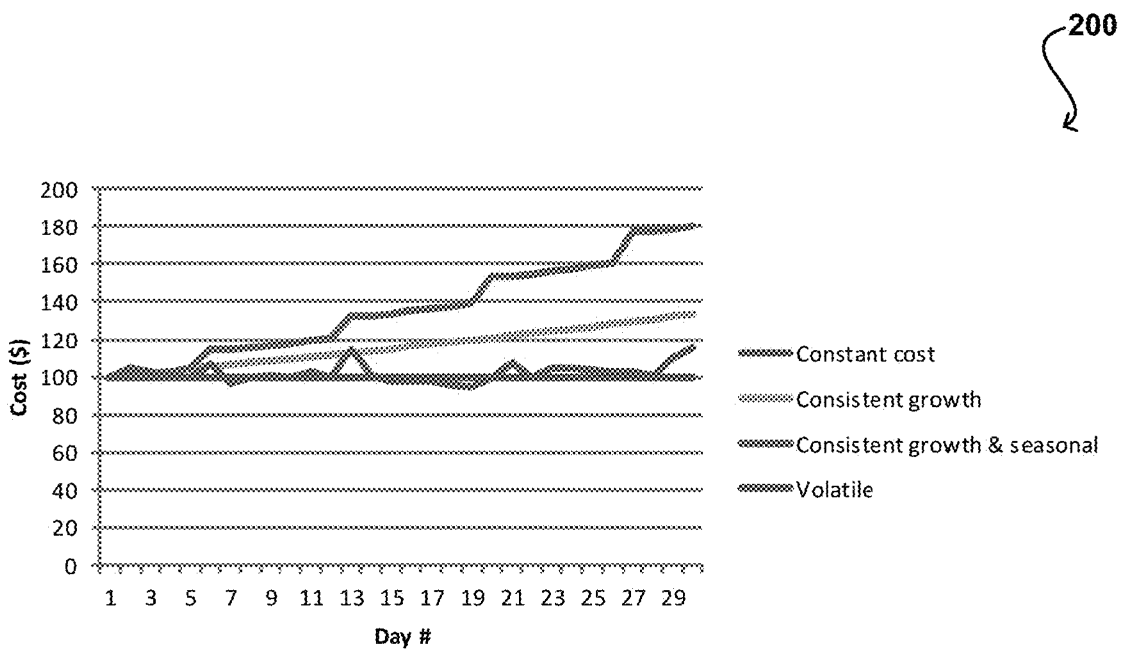
FIG. 2 illustrates example plots of usage patterns for customers in accordance with various embodiments.

FIG. 2 illustrates an example graph 200 including daily costs for a number of different types of customers. Each customer has a different type of usage pattern. In this example a first type of customer has a substantially constant cost pattern, where there is little to no variation in cost incurred from day to day. A second type of customer has a substantially consistently growing cost, where the cost incurred might grow at a substantially consistent rate, such as an increase of about 1% per day. A third type of customer has cost growth at a substantially consistent rate, but with "seasonal" or other regular variations, such as where the rate of growth is consistent except at periods such as weekends, summers, or holidays, at which a greater rate of growth may be experienced. A fourth type of customer has "volatile" cost patterns, where the cost can vary by different amounts and in different directions from day to day. Various other types of customers with different use patterns can exist as well, as may still be managed by various embodiments discussed and suggested herein.

Figure 3:
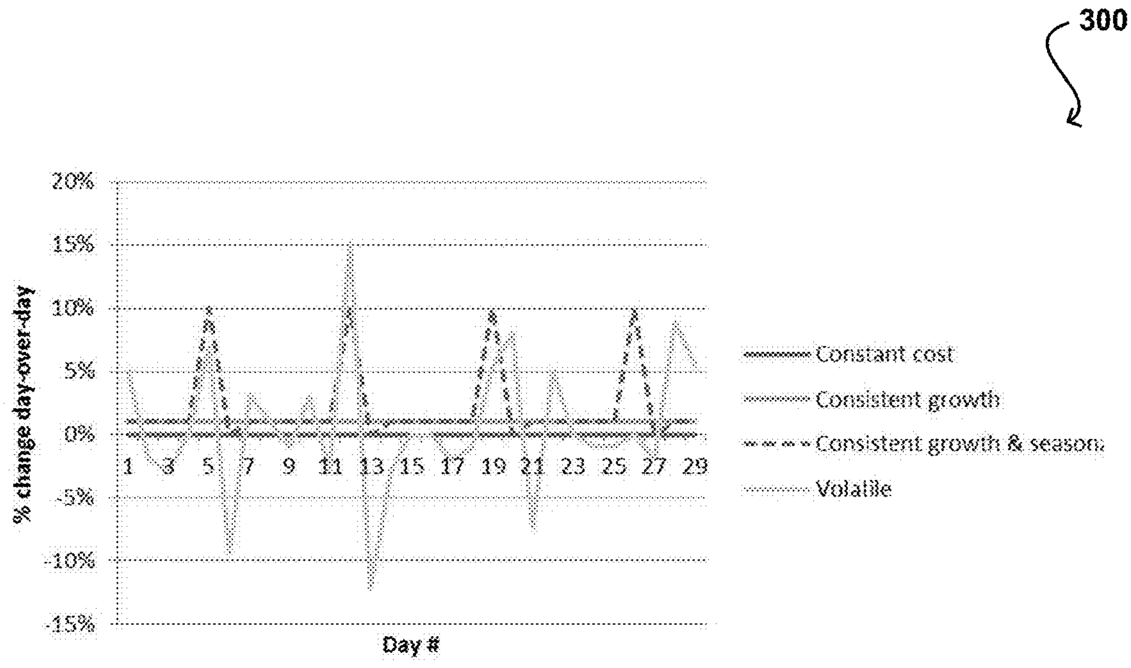
FIG. 3 illustrates example plots of daily percentage variations for the customers of FIG. 2.

In various embodiments, a component such as a monitoring component 118 in FIG. 1 can monitor the usage of various resources, such as by periodically communicating with those resources, to determine a daily amount of usage for the customer of each of a number of types of resources. The daily cost for that usage can then be determined for each customer. These costs can then be provided to an algorithm, process, program, or other such procedure whereby the difference in cost incurred can be determined with respect to the previous day. This daily cost variation can be calculated as a percentage change. The daily percentage changes then can be stored for a period of time, such that data might be available for the last thirty days in some examples. FIG. 3 illustrates one such example graph 300, wherein the daily percentage variations are plotted for each of the types of customers having data illustrated in FIG. 2. The daily variation data is calculated using the cost data from FIG. 2. As can be seen, the customer with constant cost has a constant variation of 0%, while the customer with consistent growth has a relatively constant variation of 2%. The user with the consistent growth but seasonal variation has a relatively consistent variation at about 2%, with "spikes" in percentage variation for each seasonal variation, here illustrated by a spike to about 6% variation at each weekend. The user with volatile costs has percentage variations that run from about +/−15%, with no distinct pattern of usage.

Figure 4:
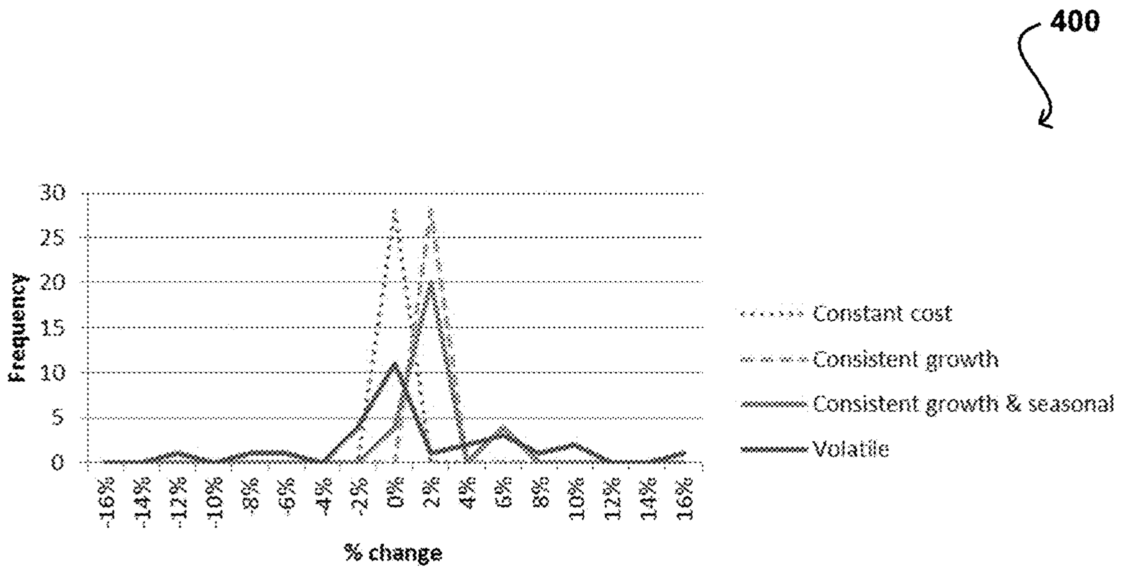
FIG. 4 illustrates example histograms for the daily percentage variations of FIG. 3.

One way to compare the variation is to consider a histogram (actual or virtual) of daily cost changes. This can be a purely mathematical calculation in at least some embodiments. In generating a histogram, the different percentage variation values over the period at issue (e.g., the last 30 days) can be aggregated and compared. FIG. 4 illustrates an example graph 400 showing histogram plots for each of the four types of users discussed previously. Each histogram plot can illustrate the percentage variations encountered, as well as the frequency or number of occurrences over that period. For example, the customer with constant cost will have a single percentage variation value of 0%, which will occur 29 times over thirty days (or 30 times if considering the day prior to that period). Similarly, if the user with a relatively consistent 2% variation has a histogram determined, the histogram with have a single percentage variation value of 2% that will occur 29 (or 30) times. The customer with the seasonal variation will have two dominant peaks, with one at 2% for the relatively consistent growth during the weekdays, and another at 6% for each weekend day. For the volatile usage customer, there are a number of peaks of different height, illustrated the relatively random nature of the usage variations.

Figure 5:
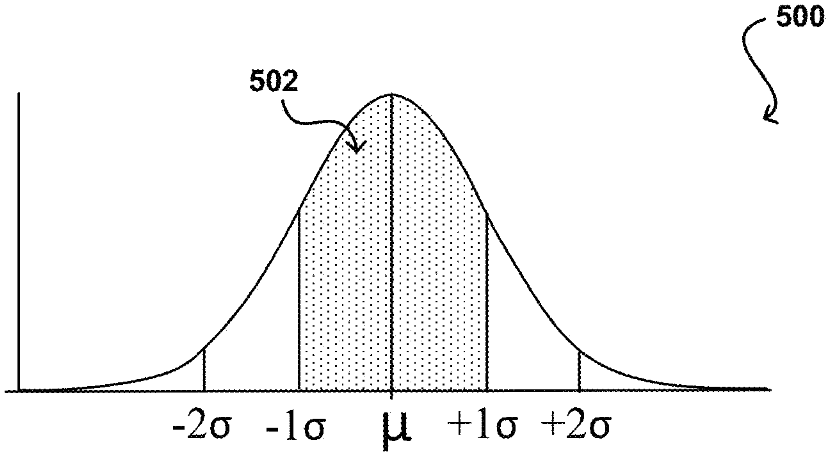
FIG. 5 illustrates an example probability distribution that can be utilized in accordance with various embodiments.

As illustrated, each of these customers has a distinctive usage pattern indicated by the pattern of cost variation. In order to determine whether the percentage variation for the most recent day was "unusual," the variation data can be compared against the histogram (or cost variation pattern) generated for that particular customer. One way to compare the most recent variation data is to map the percentage cost variation curve to a normal statistical distribution 500, such as the one illustrated in the example of FIG. 5. As known from statistics, the normal distribution 500 can be determined by first finding the mean ($\mu$) value (or average value) of the percentage variation values over the past thirty days. The standard deviation ($\sigma$) is then calculated by determining the average of the squared differences of the values from the mean (known as the variance), and then taking the square root. As with the histogram, these values can be calculated and/or determined without actually generating a plot or graph of the data. If the percentage cost variation for the last day falls within the region 502 of values less than one standard deviation from the mean (mean−1μ<x<mean+1μ, then the variation can be determined to fall within a normal range of variations. If the percentage cost variation for the day falls outside one standard deviation from the mean, or two standard deviations in some embodiments, then the cost variation can be determined to be "unusual." It might be the case that this variation is completely acceptable or expected, but for general purposes it can be desirable in at least some embodiments to notify a customer any time the cost variation is determined to be unusual. Weekly and monthly costs can be checked for similar unusual variation as well, with weekly or monthly cost variations utilized instead.

In some embodiments, it can be desirable to use other lengths or variations as well. For example, if a seasonal variation occurs at the beginning or ending of each month, it might be desirable to use a longer period, such as data for 90 days. Longer periods can hide trends in the data, but shorter periods can be more susceptible to noise. For seasonal variation such as Christmas, it might be desirable to look at weekly or monthly variations over the past few years. Similarly, different ranges might be used for different customers, as may be customizable in at least some instances. For example, a threshold other than the standard deviation might be used. In some embodiments, the threshold used can be derived from the likelihood of an event, expressed as probability P. For example, the probability of a random event (% variation) being greater than one standard deviation of T can be about 15%. In some embodiments, P can be determined via monitoring the variations, while in other embodiments P can at least initially be a fixed value determined by an appropriate user or can be based on observed patterns for a set of similar customers (i.e., all customers billing more than $1M every month for the last 12 months).

It can be desirable in at least some embodiments to monitor variations for daily, weekly, and monthly variations. For example, a daily cost variation of 2% might not be large enough to be flagged as an unusual cost pattern. However, if the daily cost increased by 2% each day for five consecutive days then the aggregate effect might have a material impact, such that might get flagged via the weekly variation analysis, as longer periods are more likely to catch cumulative small changes that have a large overall impact.

While such approaches can be advantageous for any user, the approaches may be particularly useful for large volume customers, such as customers in the enterprise space. These customers utilize many resources in various combinations, and it can be difficult to monitor the usage of all these resources. Further, the net impact can be significant even if the unusual variation is only on the order of 5%-10%. Visibility into costs and usage on a daily or other such basis can make resource environments and Web services more attractive to these customers, who then can accurately budget their usage and maintain costs within those budgets. In some embodiments, daily values might be utilized but analyzed on an hourly basis, or every few hours, such that customers can be notified soon after an unusual usage pattern occurs. In some cases, enterprise customers can also monitor costs by departments or projects, and have different owners be notified for unusual cost changes related to their department or project. This can be important for various enterprise customers where one end-receiver of a notification may not have enough knowledge to take action without additional assistance or information. In some embodiments, a customer can set up rules or policies, tag resources, include information in requests, or otherwise cause specific information to be sent to specific persons or addresses, among other such options.

A customer receiving a notification can do any of a number of things. For example, a customer might decide that the variation is still within budget or expected, or may otherwise decide to do nothing and allow the usage to proceed. Some customers might ask the provider to throttle usage or otherwise perform one or more actions to reduce the costs incurred. In other situations, customers might want to evaluate the reason for the unusual variation and take a remedial action. For example, if the customer determines that a particular user has launched a very expensive service then the customer can attempt to work with that customer to find an alternative option. Various other approaches can be utilized as well. Accordingly, in some embodiments the notification of unusual cost variation can be accompanied by information indicating the reason(s) for the variation, as well as the ability to modify the access or usage of those or other resources or services associated with the customer. A customer can also be directed to a section relating to help or best practices, for example, or directed to an expert able to assist the customer. Information obtained about unusual cost variations across multiple customers can also be used to update such information, such as where it is determined customers could save money by a different usage approach or that certain changes in the environment lead to inadvertent increases in costs. A customer can thus have the ability to be informed of unusual variations and make adjustments instead of being alarmed when a large bill is received at the end of the billing cycle. In some embodiments a customer might want notifications for particular resources or services. For example, the cost of server time might only be a few cents per hour, such that for smaller users a small variation in server time may not be worth receiving a notification. Storage might have a greater cost, such as $5 per day per 100 GB, such that users requiring a lot of storage can result in large costs that run for an entire month, whereby the customer might be more interested in learning about these or other such costs. A user can thus receive total cost data and more granular data by type of resource or service, and in some embodiments can receive a notification any time an unusual cost variation pattern is noticed in one or more of these types of data. In some embodiments, data can be monitored for specific resources, types of resources, individual services, and the like.

The variation data can be used for other purposes as well. For example, the data can be monitored and analyzed by a resource or service provider in order to determine where potential optimizations can be implemented. Further, the data can be used to make recommendations to particular customers on ways they can save money, or how they might advantageously modify resource selections, configurations, etc.

Figure 6:
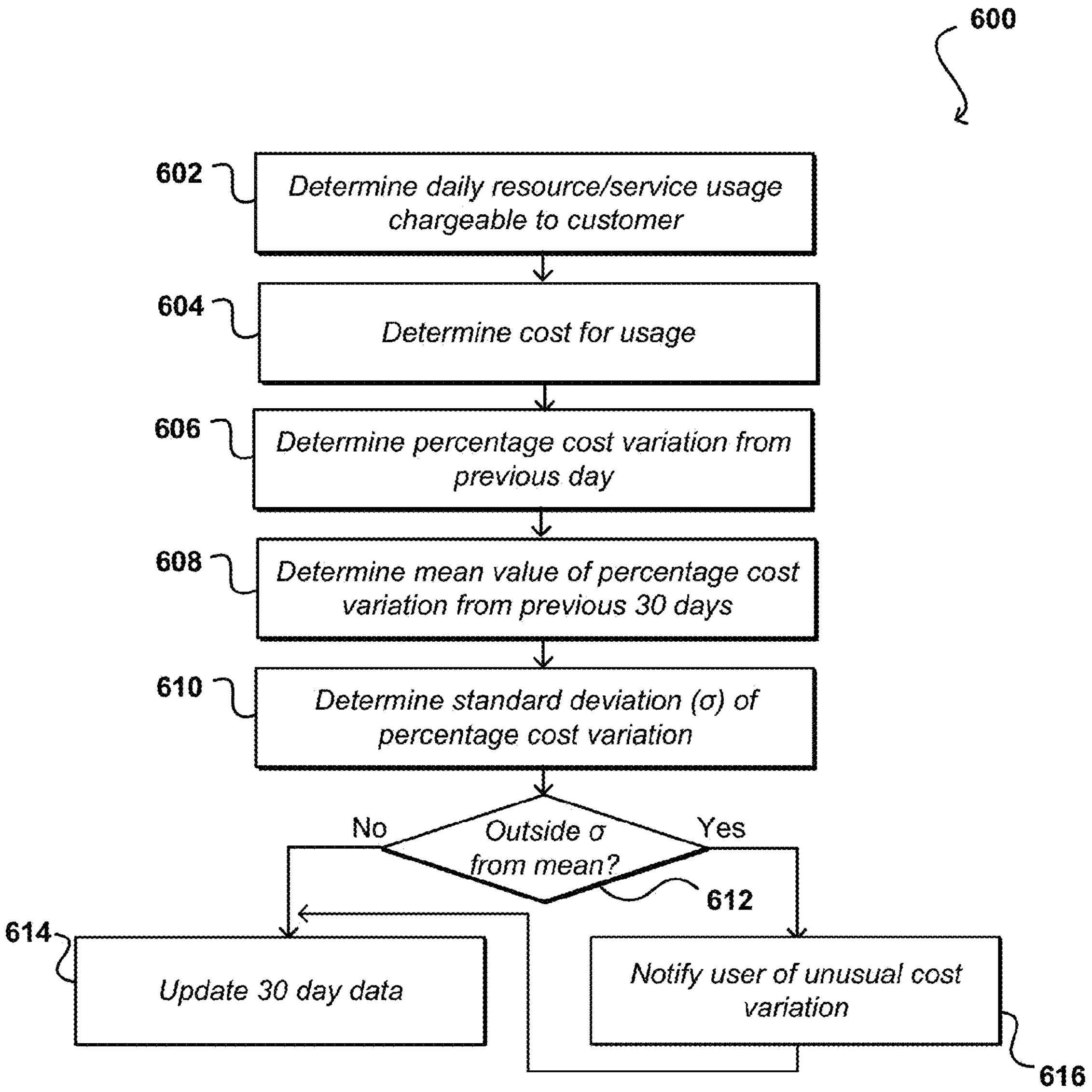
FIG. 6 illustrates an example process for determining unusual cost variations that can be utilized in accordance with various embodiments.

FIG. 6 illustrates an example process 600 for determining unusual cost variations that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, the daily usage of various resources and/or services that is chargeable to a specific customer can be determined 602. As mentioned, resources and services can include any of a server, a networking component, firmware, operating system software, middleware, application software, a security service, or a third party service, among others. The cost for this daily usage can be determined 604, such as by determining the various types of usage and multiplying the amount of usage by the cost for each type of usage. The costs for the customer for the day can then be added together for an overall daily cost in at least some embodiments. The daily cost can be compared 606 against the cost for the previous day to determine a percentage cost variation. As mentioned, percentage cost variations can have been determined for each adjacent pair of days over a determined period, such as 30 days. The mean value of the daily percentage cost variations for the previous thirty days can be determined 608, such as by adding the values and dividing by the number of values analyzed. The standard deviation over that thirty day period can also be determined 610, such as is outlined above. The percentage variation for the most recent day can then be compared to the 30 day data, and if the variation value is determined 612 to fall outside the standard deviation from the mean of the 30 day data, then the variation can be determined to be unusual and the user can be notified 616 appropriately. If the value is within the standard deviation, or if the user has been notified of a variation, the 30 day data can be updated with the most recent value, for use in analyzing the data for the next day variation.

Figure 7:
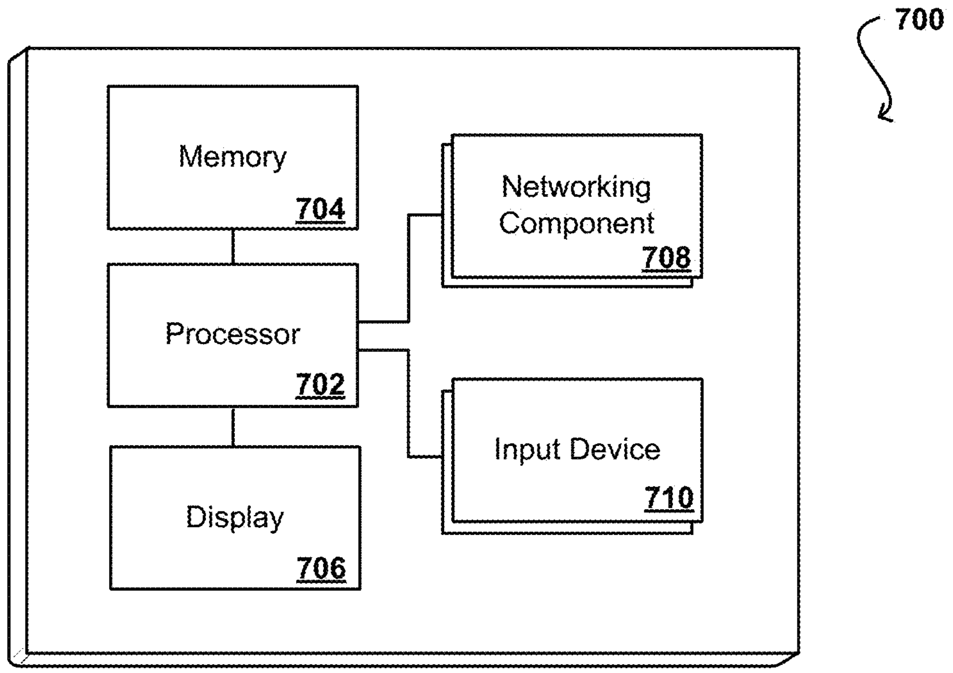
FIG. 7 illustrates a set of components of an example computing device that can be used to perform aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
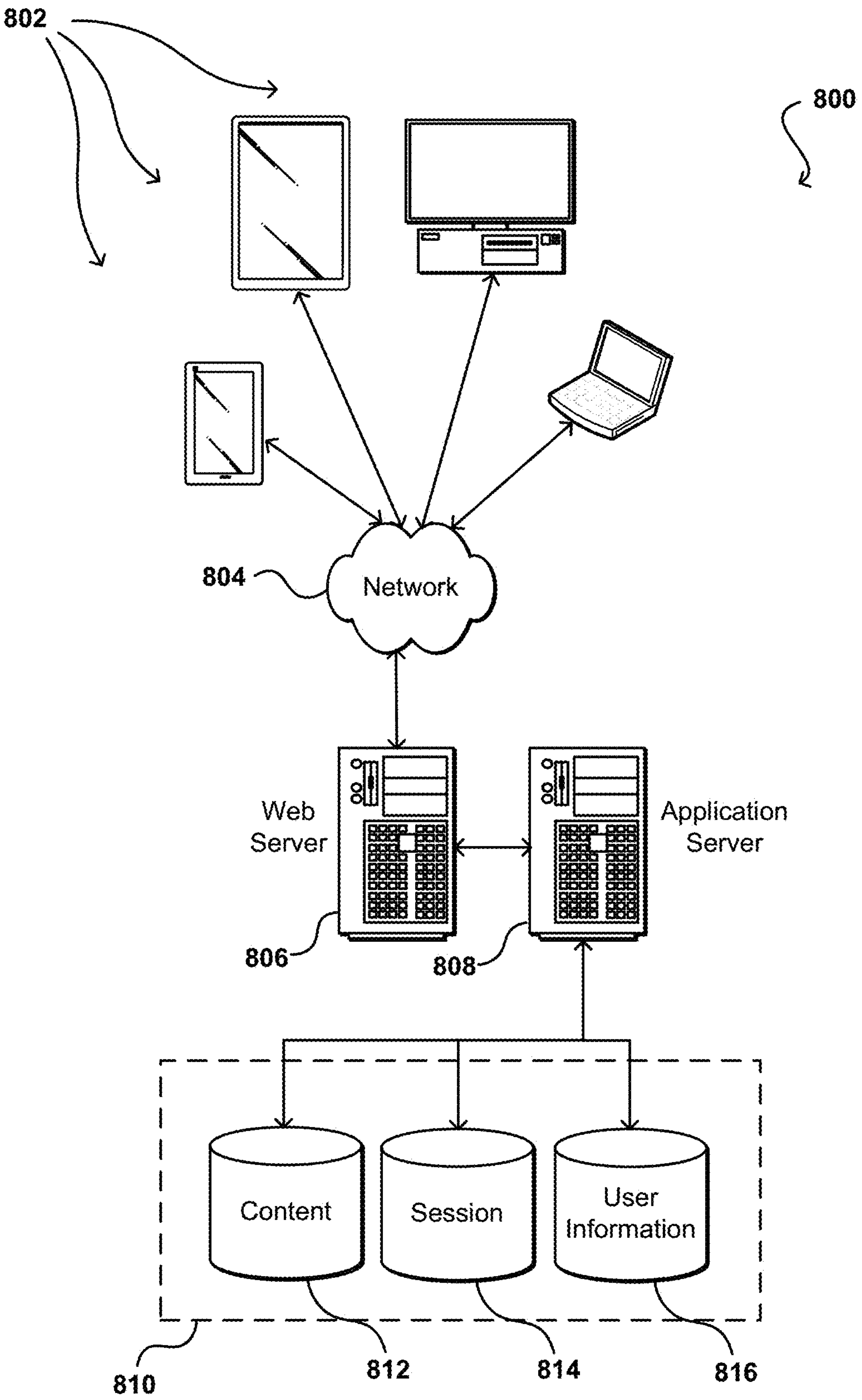
FIG. 8 illustrates an example environment in which aspects of various embodiments can be performed.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term “data store” refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:

at least one processor; and memory including instructions that, when executed by the at least one processor, cause the system to:

receive, at a data monitoring component executing on a first computing system comprising a control plane of a multi-tenant computing resource environment, data from a second computing system of the multi-tenant computing resource environment corresponding to usage of a set of computing resources executing on the second computing system and made available over a network to at least one remote computing system, the data including at least one of an amount of storage capacity utilized, an amount of bandwidth utilized, or an amount of processing time utilized;

determine, at the control plane of the computing resource environment, an amount of usage made available to the at least one remote computing system of the set of computing resources executing on the second computing system over a day, the amount of usage attributable to a customer of the computing resource environment;

determine, at the control plane of the computing resource environment, a daily cost for the amount of usage;

determine, at the control plane of the computing resource environment, a percentage cost variation for the daily cost versus a previous daily cost for a previous day;

determine, at the control plane of the computing resource environment, previous percentage cost variations for pairs of days over a time period;

determine, at the control plane of the computing resource environment, a mean value and a standard deviation of the previous percentage cost variations;

determine, at the control plane of the computing resource environment, the percentage cost variation to be unusual if the percentage cost variation falls outside the standard deviation from the mean value of the previous percentage cost variations; and cause, in response to determining the percentage cost variation to be unusual, a component of the control plane to automatically send a command to the second computing system, wherein the command causes the second computing system to perform a predetermined action of reducing the amount of usage of at least a portion of the set of computing resources made available to the at least one remote computing system in order to bring a subsequent percentage cost variation associated with the usage of at least the portion of the set of computing resources within the standard deviation from the mean value of the previous percentage cost variations.

2. The system of claim 1, wherein the instructions when executed further cause the system to:

calculate a histogram of cost variations using the previous cost variations for pairs of days over the time period, wherein the mean value and standard deviation of the previous percentage cost variations are determined based at least in part upon the calculated histogram.

3. The system of claim 1, wherein the instructions when executed further cause the system to:

determine information about the usage of each resource of the set of resources for the day; and provide the information about the usage corresponding to the unusual percentage cost variation.

4. The system of claim 1, wherein the instructions when executed further cause the system to:

add the percentage cost variation to the previous percentage cost variations for pairs of days over the time period; and remove an oldest previous percentage cost variations from the previous percentage cost variations over the time period.

5. A computer-implemented method, comprising:

receiving, at a data monitoring component executing on a first computing system comprising a control plane of a multi-tenant computing resource environment, data from a second computing system of the multi-tenant computing resource environment corresponding to usage of one or more computing resources executing on the second computing system and made available over a network to at least one remote computing system, the data including at least one of an amount of storage capacity utilized, an amount of bandwidth utilized, or an amount of processing time utilized;

determining, at the control plane of the computing resource environment, a daily cost attributable to a customer for usage made available to the at least one remote computing system of the one or more computing resources executing on the second computing system of the computing resource environment;

determining, at the control plane of the computing resource environment, a percentage cost variation for the daily cost versus a prior daily cost for an immediately prior day;

determining, at the control plane of the computing resource environment, a mean value of a set of previous percentage cost variations over a determined period of time; and determining, at the control plane of the computing resource environment, that the percentage cost variation falls outside a threshold range of the mean value of the previous percentage cost variations; and causing a component of the first computing system to send a command to the second computing system, wherein the command causes the second computing system to perform a predetermined action of reducing the usage of the one or more computing resources made available to the at least one remote computing system.

6. The computer-implemented method of claim 5, further comprising:

determining an amount of usage for each type of resource of the one or more resources, the usage being attributable to the customer;

determining a unit cost for each type of resource; and determining the daily cost attributable to the customer at least in part by summing the products of the amount of usage for each type of resource and the unit cost for each respective type of resource.

7. The computer-implemented method of claim 5, further comprising:

fitting the set of previous percentage cost variations to a normal distribution, wherein the mean value and the threshold range are determined based at least in part using the normal distribution.

8. The computer-implemented method of claim 5, further comprising:

generating a histogram using the set of previous percentage cost variations over the determined period of time, wherein the mean value and the threshold are calculated using the histogram.

9. The computer-implemented method of claim 8, further comprising:

determining the standard deviation of the set of previous percentage cost variations using the histogram; and setting the standard deviation as a value of the threshold.

10. The computer-implemented method of claim 5, further comprising:

providing the customer with information about the one or more resources associated with the percentage cost variation and an amount that the percentage cost variation falls outside the threshold range.

11. The computer-implemented method of claim 5, further comprising:

enabling the customer to adjust at least one parameter affecting the usage of the one or more resources in order to bring a subsequent percentage cost variation within the threshold range of the mean value of the previous percentage cost variations.

12. The computer-implemented method of claim 5, further comprising:

enabling the customer to specify the threshold range, wherein the customer is enabled to specify different threshold ranges for different subsets or types of the one or more resources.

13. The computer-implemented method of claim 5, further comprising:

determining a respective mean value of each set of a plurality of sets of previous percentage cost variations, each set including previous percentage cost variations over a different period of time; and notifying the customer if the percentage cost variation falls outside a threshold range of the respective mean value of at least one set of previous percentage cost variations.

14. The computer-implemented method of claim 5, further comprising:

enabling the customer to assign portions of usage of the one or more resources of the resource environment to one or more entities associated with the customer.

15. The computer-implemented method of claim 5, further comprising:

enabling the customer to designate a person to be notified if the percentage cost variation for a respective portion of the usage falls outside the threshold range of the mean value of the previous percentage cost variations for the respective portion of the usage.

16. The computer-implemented method of claim 5, further comprising:

analyzing cost patterns for usage of a plurality of resources of the resource environment by a plurality of customers; and updating usage recommendations based at least in part upon information obtained from the cost patterns.

17. A non-transitory computer-readable storage medium storing instructions that, when executed by at least one processor of a computer system, cause the computer system to:

receive, at a data monitoring component executing on a first computing system comprising a control plane of a multi-tenant computing resource environment, data from a second computing system of the multi-tenant computing resource environment corresponding to usage of one or more computing resources executing on the second computing system and made available over a network to at least one remote computing system, the data including at least one of an amount of storage capacity utilized, an amount of bandwidth utilized, or an amount of processing time utilized;

determine, at the control plane of the computing resource environment, a period cost attributable to a customer for usage made available to the at least one remote computing system of the one or more computing resources executing on the second computing system of the computing resource environment;

determine, at the control plane of the computing resource environment, a percentage cost variation for the period cost versus a prior period cost for a prior period;

determine, at the control plane of the computing resource environment, a mean value of a set of previous percentage cost variations over a determined period of time; and determine, at the control plane of the computing resource environment, that the percentage cost variation falls outside a threshold range of the mean value of the previous percentage cost variations; and cause a component of the first computing system to send a command to the second computing system, wherein the command causes the second computing system to perform a predetermined action of reducing the usage of the one or more computing resources made available to the at least one remote computing system.

18. The non-transitory computer-readable storage medium of claim 17, wherein the instructions when executed further cause the computer system to:

generate a histogram using the set of previous percentage cost variations over the determined period of time, wherein the mean value and the threshold are calculated using the histogram;

determine the standard deviation of the set of previous percentage cost variations using the histogram; and set the standard deviation as a value of the threshold.

19. The non-transitory computer-readable storage medium of claim 17, wherein the instructions when executed further cause the computer system to:

provide the customer with information about the one or more resources associated with the percentage cost variation and an amount that the percentage cost variation falls outside the threshold range.

20. The non-transitory computer-readable storage medium of claim 17, wherein the instructions when executed further cause the computer system to:

automatically throttle usage of at least one resource of the one or more resources in response to the percentage cost variation falls outside a threshold range of the mean value of the previous percentage cost variations.

* * * * *